Oct. 25, 1966     J. L. REIJNDERS     3,281,835
IDENTIFICATION DEVICE

Filed March 30, 1964     3 Sheets-Sheet 1

INVENTOR.
JOSEPH L. REIJNDERS
BY
AGENT

United States Patent Office 3,281,835
Patented Oct. 25, 1966

3,281,835
IDENTIFICATION DEVICE
Joseph Lodewijk Reijnders, Emmasingel, Eindhoven, Netherlands, assignor to North American Philips Company, Inc., New York, N.Y., a corporation of Delaware
Filed Mar. 30, 1964, Ser. No. 355,692
Claims priority, application Netherlands, Apr. 11, 1963, 291,497
14 Claims. (Cl. 343—6)

The invention relates to a device for identifying objects which are movable relatively with respect to a testing device, for example railway vehicles or objects on a belt conveyer.

In known identification devices each of the objects carries one or several information elements which transmit to the testing device on a wireless path a piece of information which is characteristic of the object in question.

The information elements may consist, for example, of tuned circuits so that the resonant frequency of the tuned circuits is measured during the passage along the testing device, the resonant frequency consequently forming a characteristic quantity.

In another known identification device a number of generators are provided on a railway vehicle, of which the frequency is characteristic.

In addition, a railway vehicle identification system is already known in which the direction of polarization of a polarized radiation produced by the testing device is turned in a characteristic manner by resonators provided on the vehicle, that is to say to the left or to the right.

When identifying railway vehicles it is desired, in general, to have the disposal of a very large number of data. This information can be expressed, for example, in a code number of ten or more decimal figures, the figures denoting, for example, the country of origin, the stand, the type of the vehicle, the number of the vehicle, etc. The result of this is that a comparatively large number of information elements must be provided on the vehicle (for example ten or more tuned circuits each tuned to one of ten different frequencies in accordance with the information code). Since in practice the space available for arranging the information elements is restricted, and for practical reasons the testing device cannot be arranged close to the train but at a distance of, for example, 50 cm. or more with respect to the information elements, the mutual distance of the information elements will in general not be large with respect to the measuring distance and, in most cases, even be much smaller. The information elements each have their own meaning with respect to the code and it must consequently be possible for the testing device to distinguish the pieces of information supplied by the various elements from one another. The information elements in the known systems differ from one another in principle only by their difference in spacial arrangement with respect to each other, which difference, as noted above, is comparatively small in general.

In connection with this, very great difficulties are experienced with respect to the distinguishing of the information elements from one another and it is necessary, for example, to choose the number of figures of the code to be smaller than is actually desired. At the comparatively low signal frequencies to be considered, an effective concentration of the radiation is not possible. Various drawbacks are associated with the use of ultra-short waves in practice and even in this case it is difficult to obtain a sufficiently sharp concentration at a comparatively short distance.

Similar difficulties are experienced with the identification of objects on a belt conveyor to which information elements are associated, because the mutual distance of these articles may be smaller than the measuring distance.

It is an object of the invention to mitigate these difficulties.

According to the invention the testing device comprises an auxiliary radiator for producing an auxiliary radiation having zero intensity in at least one particular direction. Each of the information elements further comprises means for receiving auxiliary radiation energy, and means responsive to the reception of auxiliary radiation energy for greatly decreasing the transmission of characteristic information.

The invention uses the fact that a direction in which no radiation occurs is much more sharply defined than the direction in which the intensity is maximum in the case of concentration of the radiation. The field of auxiliary radiation in this case serves as a suppression field, that is to say the field renders all information elements inoperative except where the field is zero, that is to say in the zero direction. In other words the zero direction indicates the information elements to be tested one by one.

When the information elements are constituted by resonant circuits, according to the invention a non-linear element, for example a rectifier, is coupled to the circuits in a manner such that when auxiliary radiation is received the circuits are damped. It has appeared that at a measuring distance of 60 cm. with a lateral displacement of only 1 cm., a variation in damping of the circuit can be effected of 6 db. So in spite of the comparately large measuring distance the information elements can be provided comparatively close beside one another, for example at a distance of 3 cm.

Besides by damping, the information elements can be made inoperative under the control of the auxiliary radiation energy by detuning or using a threshold circuit. In the latter case a direct voltage is derived from the auxiliary radiation energy which controls an electronic switch, for example a transistor or a diode, for rendering the information element inoperative.

Of particular importance is that it is possible according to the invention to indicate, by variation of the zero direction, the information elements to be tested one after the other independent of the movement of the vehicles.

In order that the invention may readily be carried into effect, it will now be described more fully, by way of example, with reference to the accompanying drawings, in which FIGURE 1 shows a diagrammatic embodiment of an identification device for railway vehicles.

Figure 1:
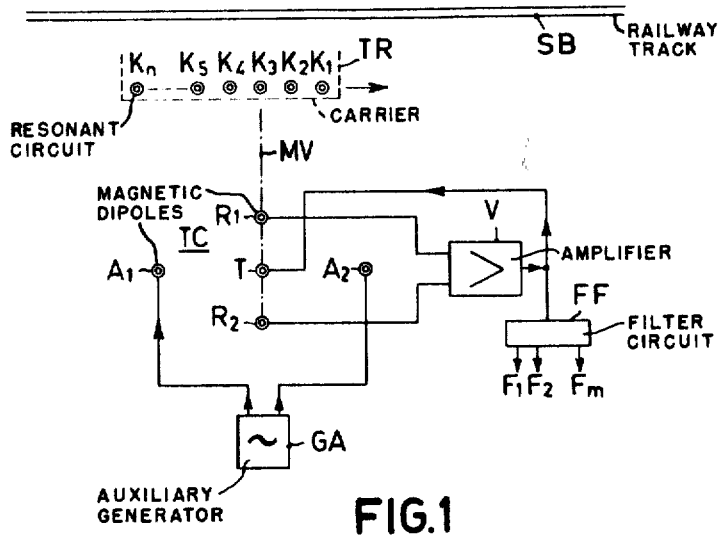

In the identification device of railway vehicles shown diagrammatically in plan view in FIGURE 1, the testing device TC comprises a number of magnetic dipoles $R_1$, $R_2$, T, $A_1$ and $A_2$ which are rigidly arranged along the railway track SB. Each dipole consists, for example, of a vertical rod of ferrite having a length of 40 cm. and having a coil coupled to it. The dipoles $R_1$ and $R_2$ are coupled to the push-pull input of an untuned amplifier V. The output of the amplifier is connected to the dipole T in a manner such that possible voltages induced in the dipoles $R_1$ and $R_2$ by the dipole T are equal to one another and counteract each other at the input of the amplifier V so that, in other words, no direct coupling exists between the output and the input of the amplifier V.

On the railway vehicles to be identified, a number of resonant circuits $K_1 \ldots K_n$ are provided on a carrier TR shown diagrammatically. The resonant frequencies of the resonant circuits are characteristic of the vehicle. These resonant frequencies have to be determined one by one by the testing device during the passage of the train. These characteristic circuits are each tuned, in accordance with the identification code, to one of, for example, ten different characteristic frequencies, which possible characteristic frequencies are the same in principle for all circuits, for example between 50 kc./s. and 150 kc./s. When such a resonant circuit passes the testing device, the balance at the amplifier input is interrupted because the distance from the circuit to the dipole $R_1$ is smaller than the dipole $R_2$ and feedback coupling is formed, through the circuit, between the output and the input of the amplifier V, as a result of which the latter starts generating in the resonant frequency of the characteristic circuit. A filter circuit FF is further connected to the output of the amplifier V. The filter network comprises a number of filters which each pass one of the ten characteristic frequencies. During the passage of a given circuit, the filter, which corresponds to the resonant frequency of this circuit, supplies an output voltage to the corresponding output $F_1$, $F_2 \ldots F_n$. This information is further recorded and handled by means which are not shown and are of no significance for the invention.

Such an identification device is known per se. Instead of the push-pull device with the magnetic dipoles $R_1$, $R_2$ and T, coils which are mounted at right angles to one another may alternatively be employed. In this case the coils are connected to the input and the output of the amplifier V in such a manner that feedback coupling in the amplifier is inadequate to sustain oscillating when no vehicle is present, and that when a vehicle is present the feedback coupling of the amplifier is influenced by the tuned circuit on the vehicle so that oscillations characteristic of the tuned circuit are generated.

In practice difficulties are experienced if, for supplying a sufficiently large number of data, several circuits for example 10 or more, have to be provided on the vehicles. The space available on the vehicles is restricted, while the distance between the train and the testing device must be comparatively large, for example more than 50 cm., for reasons of safety. In general, the mutual distance of the circuits will be much smaller than the measuring distance, so that the difference in distance between the circuits, on the one hand and the testing device on the other is comparatively small. In that case mutual interference between the circuits may occur, and the danger exists that the frequency in which the amplifier generates does not vary in accordance with the resonant frequencies of the circuits passing after one another, but that it shows a preference to that of certain circuits due to an accidental difference in Q-factor.

In order to prevent these difficulties auxiliary dipoles $A_1$ and $A_2$ are arranged on either side of the dipoles $R_1$, $R_2$ and T. These auxiliary dipoles are connected to opposite phase outputs of an auxiliary generator GA, the frequency of which is, for example, 20 kc./s. The magnetic fields produced, by the dipoles consequently counteract each other, so that, when the dipoles are fed with the same energy, the fields will neutralize each other completely in the perpendicular bisecting plane MV.

Figure 2:
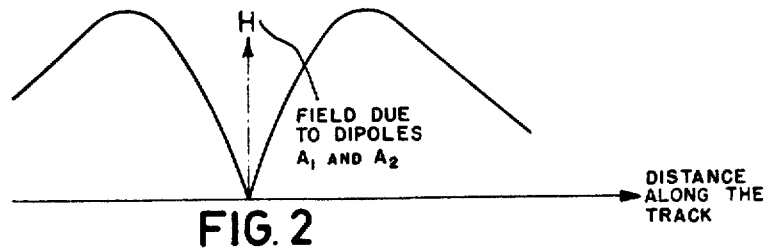
FIGURE 2 shows how the intensity of the auxiliary radiation field depends upon the distance to the zero plane.

FIGURE 2 shows how the cut-off field H produced by the dipoles $A_1$ and $A_2$ varies along the railway track in the plane of movement of the circuits $K_1$ and $K_n$ past the testing device. A sharp zero point occurs in the perpendicular bisecting plane MV. On each side of the plane MV the field is comparatively strong. The distance between the dipoles $A_1$ and $A_2$ is preferably somewhat greater than the distance between the vertical plane in which the information elements $K_1 \ldots K_n$ move and the vertical plane through the dipoles $A_1$ and $A_2$. For example, it is preferred that the distance between the dipoles $A_1$ and $A_2$ be 1.2 times larger than the distance between the plane of the information elements and the plane of the dipoles $A_1$ and $A_2$, since in that case the zero point in the curve shown in FIGURE 2 is most pronounced.

It should be noted that the phase of the field on either side of the zero plane is opposite. This is of importance because the voltage of a circuit which passes the zero plane and is tuned to the frequency of the cut-off field must become zero for a moment at any rate during the passage because the inducing voltage changes sign. The information elements may be constructed, for example, as shown in FIGURES 3 and 4.

Figures 3, 4:
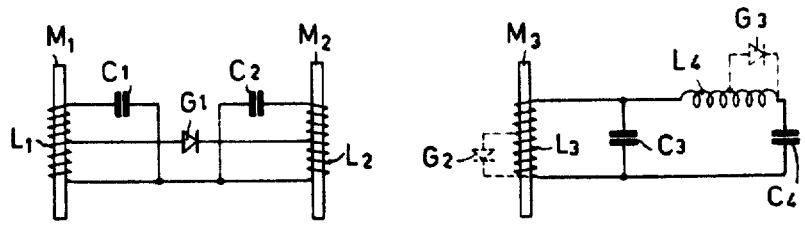
FIGURES 3 and 4 show possible embodiments of identification elements.

The information element shown in FIGURE 3 comprises two resonant circuits $L_1C_1$ and $L_2C_2$. The inductors $L_1$ and $L_2$ are coupled to the ferrite rods $M_1$ and $M_2$ which serve to render the coupling between each of the circuits and the testing device TC as large as possible during the passage. The length of these rods is, for example, 15 cm. To improve the Q-factor, also only a part of the inductors may be coupled to ferrite rods. The resonant frequency of the circuit $L_1C_1$ is characteristic of the information to be supplied by the element and this circuit consequently corresponds to the above characteristic circuits $K_1 \ldots K_n$. The circuit $L_2C_2$ is tuned to the frequency of the generator GA. In addition the circuits $L_1C_1$ and $L_2C_2$ are connected together by the rectifier $G_1$ which is connected to suitably chosen tappings on the inductors $L_1$ and $L_2$. When the information element is in the field of radiation of the auxiliary dipoles $A_1$ and $A_2$, a voltage is formed across the circuit $L_2C_2$. As a result the rectifier $G_1$ becomes conductive and the circuit $L_1C_1$ is attenuated so strongly that the above feedback coupling of the amplifier V is too weak to cause it to generate in the resonant frequency of the circuit $L_1C_1$. When, however, the ferrite rod $M_2$ passes through the perpendicular bisecting plane MV of the dipoles $A_1$ and $A_2$, where the auxiliary field is zero, the rectifier G is cut off and the circuit $L_1C_1$ consequently is not damped, so that the amplifier V starts generating oscillations at the resonant frequency of the circuit $L_1C_1$. In this case it should be noted that the oscillation in the characteristic circuit $L_1C_1$ in these circumstances is much weaker than that which is induced in the circuit $L_2C_2$ outside the zero plane by the auxiliary radiation, so that the rectifier G does not substantially damp the circuit $L_1C_1$ around the zero plane. The damping of the characteristic circuits under the control of the auxiliary radiation is very effective. For example, as was already noted, at a measuring distance of approximately 60 cm., a displacement of an information element through a distance of only 1 cm. in the proximity of the zero plane MV of the auxiliary radiation, may result in a 6 db variation of the damping of the characteristic circuit.

The information element shown in FIGURE 4 comprises only one ferrite rod which is coupled to the inductor $L_3$. In parallel with it are arranged the capacitor $C_3$ and the series circuit of the inductor $L_4$ and the capacitor $C_4$. As is known, such a network has two resonant frequencies. These elements are chosen so that one resonant frequency corresponds to one of the characteristic frequencies and the other corresponds to the frequency of the auxiliary radiation. In addition, a rectifier $G_2$ is connected in parallel with a part of the inductor $L_3$. Alternatively, a rectifier $G_3$ may be connected in parallel with a part of inductor $L_4$, or both of the rectifiers $G_2$ and $G_3$ may be employed. The operation of this information element mutatis mutandis equals that of FIGURE 3.

That is to say, when auxiliary radiation energy is received the resonance is damped by the presence of the non-linear elements. In principle, the ferrite rod may also be coupled to the inductor $L_4$ instead of to the conductor $L_3$.

During the identification of railway vehicles, the difficulty may present itself that the direction in which the vehicles move along the testing device is not continuously the same, but that a vehicle may temporarily perform a reciprocating movement. This means that the information elements are not scanned, for example, in the sequence $K_1$, $K_2$, $K_3$, $K_4$, $K_5$, $K_6$ etc. but, for example, in the sequence $K_1$, $K_2$, $K_3$, $K_4$, $K_3$, $K_2$, $K_3$, $K_4$, $K_5$, $K_6$ and so on.

This difficulty may be solved by means of the method of the auxiliary radiation with zero direction. As a matter of fact it is not necessary that the plane in which the intensity of the auxiliary radiation is zero is always the same but this may be varied. As a result of this it is possible to scan the information elements with such a speed and/or direction that its sequence is independent of the movement of the train.

Figure 5:
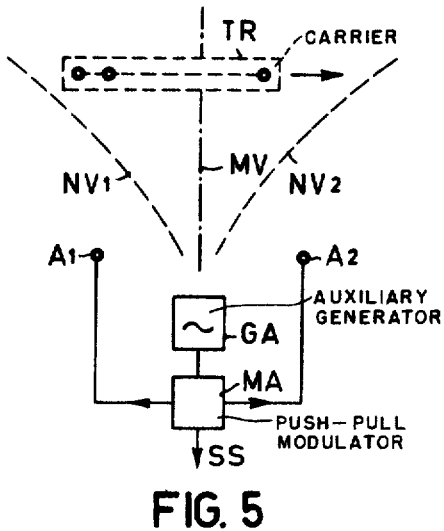
FIGURE 5 shows how the direction of the zero plane can be varied as is used in the embodiments shown in FIGURES 6 and 7.

In FIGURE 5, only the auxiliary dipoles $A_1$ and $A_2$ are shown, while the actual testing device which may be designed in a manner corresponding to FIGURE 1, is omitted for reasons of clarity. In this case the auxiliary dipoles are not fed directly by the generator GA, but through a push-pull modulator MA which is controlled by a control voltage SS in a manner such that the mutual ratio of the supply current supplied to the dipoles can be varied. The magnetic fields produced individually by the dipoles are in opposite phases at any moment as was the case with the device shown in FIGURE 1. If the control voltage SS is zero, the dipoles $A_1$ and $A_2$ are equally strong and, as also in FIGURE 1, the magnetic field produced by the dipoles together will be zero in the perpendicular bisecting plane MV of the dipoles.

If the voltage SS becomes positive, for example, the supply current from the dipole $A_2$ will become larger and that from the dipole $A_1$ smaller, so that now the field in the plane $NV_1$ becomes zero. Conversely, if the dipole $A_1$ is stronger than $A_2$, the zero plane will bend to the right, for example according to $NV_2$. Since at a given instant only an information element is tested which is substantially in the zero plane, the information elements can be scanned after each other by suitable variation of the zero plane even in case of a stationary train.

Figure 6:
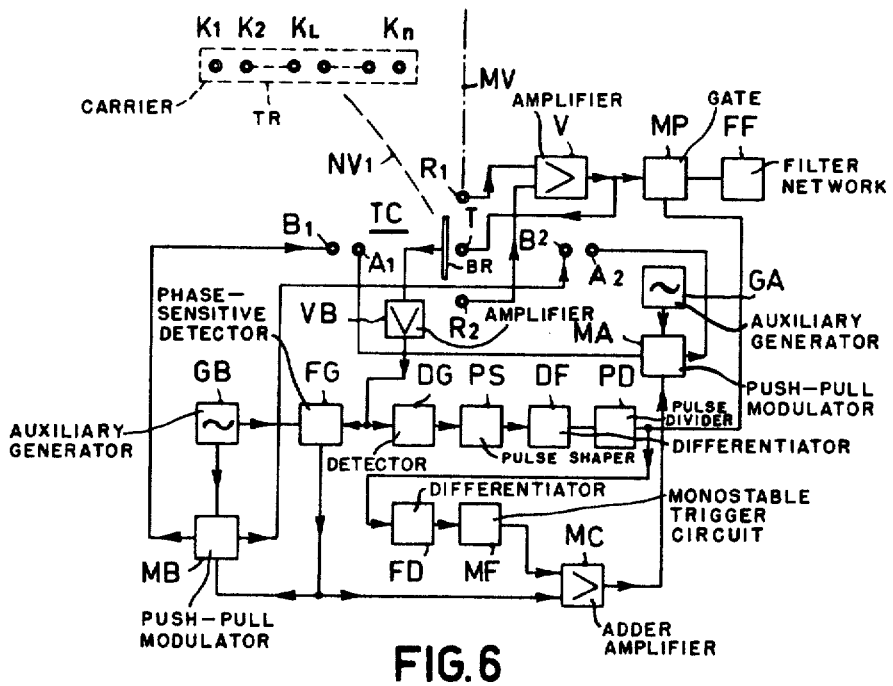
FIGURE 6 shows one embodiment of the invention for varying the zero plane.
Figure 7:
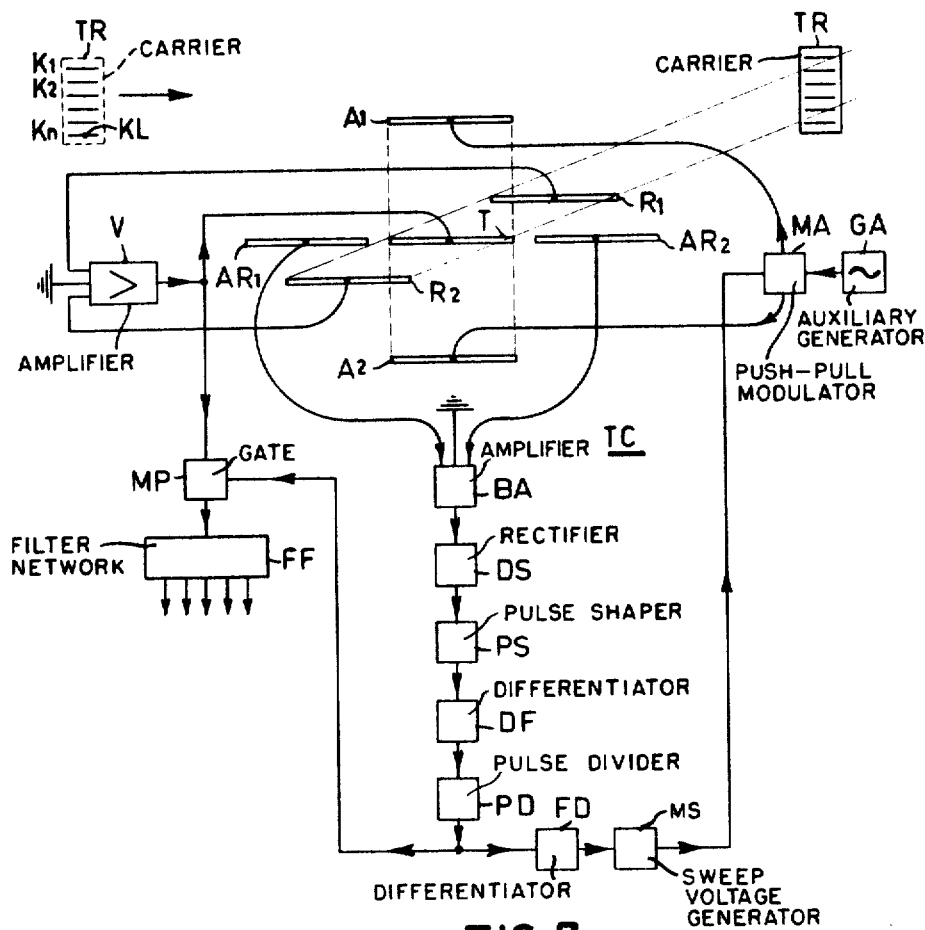
FIGURE 7 shows another embodiment of the invention for varying the zero plane.

In the devices shown in FIGURES 6 and 7 this principle is further elaborated.

In the identification system shown in FIGURE 6 the information elements $K_1$, $K_2$ etc. are again arranged on the train beside each other in a horizontal row. But in this case an additional auxiliary circuit KL is added which is tuned to the frequency of the generator GB, for example 25 kc./s., which differs from the frequency of the generator GA (for example 20 kc./s.). The testing device TC comprises a number of vertical magnetic dipoles, of which the dipoles $R_1$, $R_2$ and T are coupled in the manner as described to the untuned amplifier V, the output of the amplifier is connected, through a normally cut-off gate MP, to the filtering circuit FF which serves for distinguishing the characteristic frequencies. Auxiliary dipoles $B_1$ and $B_2$ are arranged beside the dipoles $A_1$ and $A_2$, which determine the zero plane of the auxiliary radiation. The dipoles $A_1$ and $B_1$ and $A_2$ and $B_2$ respectively, however, may in principle also coincide. In addition, another horizontal receiving dipole BR is provided in a manner such that it cannot receive any direct energy from the dipoles $B_1$ and $B_2$.

The dipoles $B_1$ and $B_2$ are connected to outputs of the push-pull modulator MB in a manner such that the fields produced by the dipoles counteract each other. The modulator MB is supplied by the generator GB and for the rest is designed in the same manner as the modulator MA shown in FIGURE 5. That is to say, if the control voltage supplied to the modulator MB by the phase-sensitive detector FG is zero, the dipoles $B_1$ and $B_2$ will produce a second auxiliary radiation field (analogous to the dipoles $A_1$ and $A_2$) with a zero plane which normally coincides with the perpendicular bisecting plane MV, but which zero plane can be varied by variation of the control voltage. The phase of the auxiliary radiation field is opposite on the left and on the right-hand side of the zero plane. That is to say, on the left-hand side of the zero plane it follows the phase of the dipole $B_1$ and on the right-hand side of the zero plane it follows that of the dipole $B_2$.

When a vehicle approaches, for example from the left, energy from the dipoles $B_1$ and $B_2$ is reflected by the circuit KL provided on it and is then received by the dipole BR. After amplification by the amplifier VB the phase-sensitive detector FG compares the phase of the oscillation to that of the generator GB and supplies a control voltage to the modulator MB. The polarity of the control voltage depends upon the phase of the oscillation received, for example in this case positive, because the vehicle was on the left-hand side of the zero plane. The supply current of the dipole $B_2$ is then increased by the modulator MB and that of the dipole $B_1$ is decreased so that the zero plane is bent to the left, that is to say in the direction where the vehicle is. As the vehicle approaches, the reflected energy increases, and the zero plane is bent further to the left. However, the zero plane cannot entirely reach the circuit KL for in that case no energy would be reflected and, consequently, control voltage would remain for the modulator MB. In the case of a sufficiently large amplification, the difference in distance, however, need not be large. The reflected energy then passes through a maximum to decrease to zero at the instant the circuit KL passes the perpendicular bisecting plane MV, so that the zero plane of the auxiliary radiation also becomes located in this plane. During this latter phase the zero plane followed the movement of the train. Then the reflected energy again increases, and the zero plane continues following the vehicle because the phase of the oscillation received is now inverted and the control voltage of the modulator MB has a negative polarity. The zero plane remains, in principle, somewhat on the left-hand side of the circuit KL. Then the reflected energy passes through a second maximum and again decreases. Then the zero plane leaves the vehicle and again moves to the center as the vehicle moves further along the track. The reflected energy received by the dipole BR, after amplification, is also supplied to the detector DG which supplies an output voltage to the pulse shaper PS. The intensity of the output voltage is proportional to the amplitude of the oscillation received. As was already noted, this amplitude passes through a first maximum and then through a second maximum. Correspondingly, the pulse shaper PS suddenly passes from the rest condition into the operating condition when the output voltage of the detector DG reaches a given threshold value, and returns to the rest condition when the voltage decreases. This cycle is repeated when traversing the second maximum. In this case the pulse shaper PS supplies a square wave output voltage to the differentiating circuit DF which, in the variations of the condition of the pulse shaper first supplies, for example, a positive pulse, then a negative pulse, a positive pulse and again a negative pulse to the pulse divider PD. Normally the pulse divider PD is in a rest condition and is designed so as to be phase-sensitive to negative pulses only. With the first negative pulse the pulse divider passes into the operating condition and with the second negative pulse returns to the rest condition. During the first part of the period in which the pulse divider is in the operating condition the zero plane of the auxiliary radiation produced by the dipoles $B_1$ and $B_2$ follows the vehicle. As will be described below, the actual identification also takes place in this period and the pulse divider accordingly renders the gate MP between the amplifier V and the filtering device FF conductive in its operating condition.

When the pulse divider PD passes into the operating condition it also supplies, through the differentiator FD, a starting pulse to the monostable trigger circuit MF which then supplies a sweep voltage to the adder amplifier MC. The output voltage of the phase-sensitive detector FG is added to the sweep voltage, so that the sum of these voltages is supplied to the modulator MA by the amplifier MC.

The modulator MA controls the mutual ratio of the supply current of the dipoles $A_1$ and $A_2$ as was explained with reference to FIGURE 5. If the modulator MA were to receive only the output voltage of the detector FG, the zero plane of the auxiliary radiation produced by the dipoles $A_1$ and $A_2$ would continuously assume a position which corresponds to that of the zero plane of the auxiliary radiation of the dipoles $B_1$ and $B_2$. However, it has been ensured that by a difference in bias voltage at the modulators MB and MA the zero plane of the dipoles $A_1$ and $A_2$ is directed somewhat more towards the left than the zero plane of the dipoles $B_1$ and $B_2$, so that, when the latter zero plane follows the movement of the circuit KL, the first zero plane is directed on the left-hand side of the information element $K_1$ which is on the extreme left.

At the instant the pulse divider passes into the operating condition the monostable trigger circuit MF, as already noted, superimposes, through the amplifier MC, a sweep voltage on the follower-control voltage of the modulator MA. Consequently, the zero plane of the cut-off field produced by the dipoles $A_1$ and $A_2$ superimposed upon the following movement, will perform a rapid scanning-movement to the right across the information elements $K_1$, $K_2$ etc. As a result, as was explained with reference to FIGURE 1, a feedback coupling of the amplifier V will be effected successively through the information elements which are in the zero plane, so that the amplifier will start generating successively in the corresponding characteristic frequencies and will transmit, through the conductive gate MP, corresponding information to the filtering device FF, as a result of which the identification has been effected.

If the train approached from the right instead of from the left, the identification device operates in a corresponding manner in that sense that in that case the zero planes will follow the train from the right to the left, but the scanning-movement of the auxiliary radiation of the dipoles $A_1$ and $A_2$ superimposed on this following-movement takes place, in this case also, from the left to the right. This is of importance because now the sequence in which the information elements are tested is independent of the direction of movement of the train so that in this respect no particular precautions need be taken as is the case, in general, with other identification systems. Because the scanning movement of the zero plane is superimposed on a movement which the train follows, the speed at which the elements are scanned is substantially independent of the speed of the train. As a result of the following-movement also the above buffering effect of the train is removed because the following-movement of the zero plane also follows the buffer movement of the vehicle.

Instead of a monostable trigger circuit MF a sweep voltage generator may advantageously be used which supplies a multiple sweep voltage, in a manner such that the series of information elements is scanned a predetermined number of times, for example two times or three times. This has the advantage that the various series of information can be compared mutually and possible errors can be discovered and corrected.

The direction in which the train is moving may also be established in a simple manner by means of the device shown in FIGURE 6, which may sometimes be desirable because a vehicle which passes in a given direction can be "entered" in the administration as it were, and a vehicle moving in the opposite direction can be "written off," for example at the entrance of a railway yard. The polarity of the output voltage of the phase sensitive detector FG at the instant the pulse divider PD passes into the operating condition as a matter of fact is decisive of this direction as will be clear from the above.

In the device shown in FIGURE 7 the scanning of the information elements is entirely independent of the direction of movement of the train, for the information elements $K_1 \ldots K_n$ in this case are arranged in a vertical plane over each other on the carrier TR and the scanning movement is performed in a vertical direction. In connection with this the zero plane of the auxiliary radiation which effects the scanning of the elements need not follow the movement of the train and the testing device TC shown in FIGURE 7 is simpler than that shown in FIGURE 6.

The ferrite rods of the information elements on the carrier TR are horizontal in this case, while the various magnetic dipoles of the testing device are arranged horizontally parallel to the railway track. The receiving dipoles $R_1$ and $R_2$ and the transmitting dipole T are in the same horizontal plane and are connected, as was the case in the device shown in FIGURE 1, to the input and output respectively of the amplifier V. This output, as was the case in FIGURE 6, is connected through a gate MP to the filtering device FF.

The auxiliary dipoles $A_1$ and $A_2$ which determine the zero plane of the auxiliary radiation are arranged over each other and, as in FIGURE 6, connected to a modulator MA fed by the generator GA. The rest adjustment hereof is such that the zero plane points to a position above or below the information carrier TR when it passes the testing device. In addition, the testing device comprises two receiving dipoles $AR_1$ and $AR_2$ for the auxiliary radiation, which are connected to inputs of the push-pull amplifier BA and are arranged symmetrically with respect to the dipoles $A_1$ and $A_2$ in a manner such that no direct radiation of these dipoles is received. The output of the amplifier BA is connected to a circuit of a rectifier DS, a pulse shaper PS, a differentiating network DF and a pulse divider PD, the output of which is connected on the one side to the gate MP and on the other side, through the differentiator FD, to the sweep voltage generator MS. The output of generator MS is connected to the push-pull modulator MA. This circuit corresponds to that of the corresponding elements shown in FIGURE 6 and its operation is analogous.

On the information carrier TR on the train a resonant circuit KL is provided which is tuned to the frequency of the generator GA and which will reflect auxiliary radiation energy from the dipoles $A_1$ and $A_2$ to the receiving dipoles $AR_1$ and $AR_2$ during the passage of the testing device TC. When the train approaches from the left, the dipole $AR_1$ will originally receive more energy than the dipole $AR_2$. The voltage supplied by the amplifier BA first increases and then again decreases to zero at the instant the circuit KL assumes a symmetrical position with respect to the dipoles $AR_1$ and $AR_2$. Then the voltage again increases, since now the dipole $AR_2$ receives more energy than the dipole $AR_1$, after which the voltage passes through a second maximum and decreases again as the circuit KL removes from the testing device.

The output voltage of the amplifier BA, during the passage of a vehicle and independent of its direction, consequently passes successively through a first and through a second maximum as also the output voltage of the amplifier VB of FIGURE 6. As was the case in the device shown in FIGURE 6 the pulse divider PD passes into the operating condition at a suitable instant, as a result of which the gate MP becomes conductive and a starting pulse is supplied through the differentiator FD to the sweep voltage generator MS, as a result of which the modulator MA becomes operative and the zero plane of the dipoles determined by $A_1$ and $A_2$ is moved once or a predetermined number of times in a vertical direction, as a result of which the information elements are scanned and the amplifier V starts generating successively in the characteristic frequencies in question.

The auxiliary circuit KL may in principle also be omitted in this case because the circuits of the various information elements tuned to the auxiliary frequency already perform a similar function. Since, however, these circuits are damped by the presence of the non-linear elements, a separate auxiliary circuit KL may be desirable all the same.

What I claim is:

1. An object identification system of the type in which an object to be identified has a relative movement with respect to a testing device, comprising a plurality of spaced apart information carrying devices on said object, a testing device, said testing device comprising input means coupled in energy transferring relationship with said information carrying devices whereby said testing device provides an output signal characteristic of each information carrying device, said testing device further comprising means for producing an auxiliary energy field having at least one plane of substantially zero energy, said information carrying devices comprising means responsive to their presence in said auxiliary energy field for reducing the transfer of energy between said information carrying devices and said input means whereby said testing device is responsive to said information carrying devices only when they are in said plane.

2. An object identification system comprising an object to be identified, said object having a plurality of spaced apart information carrying devices, a testing device, said testing device having input means coupled in energy transferring relationship with said information carrying devices whereby said testing device produces output signals characteristic of said information carrying devices when said information carrying devices are sufficiently close to said input means, said testing device comprising means for producing an auxiliary energy field having at least one plane of substantially zero intensity, said information carrying devices comprising means responsive to the intensity of said energy field for reducing the coupling of energy between said information carrying devices and said input means, whereby said testing device produces output signals characteristic only of information carrying devices positioned in said plane.

3. An object identification system of the type in which an object to be identified may have a relative movement with respect to a testing device, said system comprising a testing device, a plurality of characteristic information carrying devices positioned on said object, said information carrying devices comprising means for transmitting radiant energy of predetermined frequencies to said testing device, said testing device comprising means responsive to the reception of energy from said information carrying device for producing an output signal characteristic of the information carrying devices from which energy has been received, said testing device further comprising means for producing an auxiliary radiation field at a frequency differing from said predetermined frequencies, said auxiliary field having at least one plane of substantially zero intensity, said information carrying devices further comprising means for receiving energy from said auxiliary field and means responsive to the reception of energy from said auxiliary field for reducing the transmison of energy said predetermined frequencies, whereby said testing device is responsive to produce output signals characteristic of said information carrying devices only when they are in said plane.

4. The system of claim 3 in which each of said information carrying devices comprises a first tuned circuit tuned to the frequency of said auxiliary field, a second tuned circuit tuned to one of said predetermined frequencies, means for applying energy from said auxiliary field to said first tuned circuit, and nonlinear element means connected to said first and second turned circuits for damping said second tuned circuit when energy of said auxiliary field is applied to said first turned circuit.

5. The system of claim 4 in which said first tuned circuit comprises a parallel circuit of a first capacitor and first inductor, said means for applying said energy of said auxiliary field to said first tuned circuit comprises a first magnetic dipole coupled to said first inductor, said second tuned circuit comprises a parallel circuit of a second capacitor and a second inductor, and said nonlinear element means is connected between said first and second inductors, and said information carrying means further comprises a second magnetic dipole coupled to second inductor.

6. The system of claim 4 in which one of said first and second tuned circuits is a series circuit of a first inductor and first capacitor, and the other of said first and second circuits is a parallel circuit of a second inductor and second capacitor, means connecting said series and parallel circuits in parallel, said means for applying energy to said first tuned circuit comprises a magnetic dipole coupled to one of said inductors, and said nonlinear element is connected in parallel with at least a portion of one of said inductors.

7. The system of claim 3 in which said information carrying device comprises means for converting received energy from said auxiliary field to a direct current, switch means connected to render said information carrying device inoperative, and means for applying said direct current to said switch means whereby said information carrying device is inoperative when it is present in said auxiliary field.

8. The system of claim 3 wherein said testing device comprises means for moving said plane.

9. An object identifying system comprising an object to be identified, a plurality of spaced apart characteristic information carrying devices on said object, a testing device, said testing device having input means coupled in energy transferring relationship with said information carrying devices whereby said testing device produces output signals characteristic of said information carrying devices when said information carrying devices are sufficiently close to said input means, said testing device further comprising means for producing a radiant energy field of predetermined frequency having at least one plane of substantially zero intensity, each of said information carrying devices comprising means responsive to the intensity of said field at the location of the respective information carrying device for reducing the coupling between the respective information carrying device and said input means, whereby said testing device is responsive only to an information carrying device when it is located in said plane.

10. The system of claim 9 in which said means for producing said radiant energy field comprises first and second magnetic dipoles positioned in spaced apart parallel relationship, a source of oscillations of said predetermined frequency, and means for coupling said oscillations to said dipoles in opposite senses.

11. The system of claim 10 in which said object is adapted to move with respect to said testing device, comprising modulator means for coupling said oscillations to said dipoles for varying the plane of said field by varying the mutual intensity ratio of the fields produced separately by said dipoles.

12. The system of claim 11 wherein the perpendicular bisecting plane of said first and second dipoles is normal to the direction of relative movement of said object, and said information carrying devices are positioned on said object in a row parallel to said direction of movement.

13. The identification system of claim 12 wherein said testing device further comprises third and fourth magnetic dipoles, a source of second oscillations of a second predetermined frequency differing from said first mentioned frequency, second modulator means for coupling said second oscillations to said third and fourth dipoles to produce a second auxiliary field having a second plane of substantially zero intensity, and fifth dipole means for receiving energy of said second frequency, means on said object adjacent said information carrying devices for coupling energy of said second field at said second frequency to said fifth dipole, said testing device comprising phase detector means for detecting energy received by said fifth dipole to produce a control voltage, means applying said control voltage to said second modulator means whereby said second plane is deflected toward said information carrying devices, means producing a sweep voltage, and means applying said sweep voltage and control voltage to said first mentioned modulator means.

14. The system of claim 11 wherein said plane of said field is parallel to the direction of relative movement of said object, comprising means for varying the direction of said plane in a direction at right angles with respect to said direction of movement, said information carrying devices being arranged in a row normal to said direction of movement so that they successively pass through said plane.

References Cited by the Examiner

Car Identifiers Win RR Group Approval, Railway Signalling and Communications, February 1962, pages 15, 16, 17, and 20.

Microwaves Identify Freight Cars, by Hamman and Boyd, Control Engineering, vol. 9, No. 3, March 1962, pages 102–104.

21 Ways to Pick Data Off Moving Objects, by Barber, Control Engineering, Part I in vol. 10, No. 10, October 1963, pages 82–86; Part II in vol. 11, No. 1, January 1964, pages 61–64.

CHESTER L. JUSTUS, *Primary Examiner.*

P. M. HINDERSTEIN, *Assistant Examiner.*